(12) United States Patent
Hornby et al.

(10) Patent No.: US 9,151,201 B2
(45) Date of Patent: Oct. 6, 2015

(54) LASER WELDED AUTOMOTIVE DIESEL EXHAUST HC DOSING VALVE

(75) Inventors: Michael J. Hornby, Williamsburg, VA (US); Stephen C. Bugos, Poquoson, VA (US); Hamid Sayar, Newport News, VA (US); David Stockmaster, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 2612 days.

(21) Appl. No.: 11/808,511

(22) Filed: Jun. 11, 2007

(65) Prior Publication Data

US 2008/0105841 A1    May 8, 2008

Related U.S. Application Data

(60) Provisional application No. 60/864,810, filed on Nov. 8, 2006.

(51) Int. Cl.
| | |
|---|---|
| F01N 3/00 | (2006.01) |
| F01N 3/20 | (2006.01) |
| F01N 3/025 | (2006.01) |
| F01N 3/10 | (2006.01) |
| F01N 13/00 | (2010.01) |
| F01N 13/18 | (2010.01) |
| F02B 37/22 | (2006.01) |

(52) U.S. Cl.
CPC ............ *F01N 3/2033* (2013.01); *F01N 3/0253* (2013.01); *F01N 3/103* (2013.01); *F01N 3/106* (2013.01); *F01N 13/009* (2014.06); *F01N 13/0093* (2014.06); *F01N 13/0097* (2014.06); *F01N 13/1838* (2013.01); *F02B 37/22* (2013.01); *Y02T 10/26* (2013.01)

(58) Field of Classification Search
USPC .......... 60/273, 274, 284, 286, 295, 299, 300, 60/301; 239/585.1, 533.2
See application file for complete search history.

(56) References Cited

U.S. PATENT DOCUMENTS 3,699,773 A * 10/1972 Schuning et al. ............... 60/743
5,273,020 A    12/1993 Hayami
5,709,080 A     1/1998 Arora
(Continued)

FOREIGN PATENT DOCUMENTS

EP    1176292 A1    1/2002
EP    1211396 A2    5/2002

OTHER PUBLICATIONS

U.S. Appl. No. 11/723,049, Hornby, Mar. 16, 2007.
(Continued)

*Primary Examiner* — Jesse Bogue

(57) ABSTRACT

Dosing structure (30) supplies diesel fuel to an exhaust passage of a diesel system. The dosing structure includes an electrically operated control valve (31). An inlet tube (45) is coupled with an inlet of the control valve. A first welded joint (6) is between the inlet tube and the control valve. The inlet tube is constructed and arranged to be coupled to a supply of diesel fuel for feeding fuel to the control valve. A dosing valve (32) is constructed and arranged to receive fuel from the control valve and deliver the fuel to the exhaust passage. An extension tube (33) is fluidly coupled between the control valve and the dosing valve to space the control valve from the dosing valve. A second welded joint (62) is between the extension tube and the control valve and a third welded joint (64) is between the extension tube and the dosing valve.

2 Claims, 4 Drawing Sheets

(56) References Cited

U.S. PATENT DOCUMENTS

| | | | |
|---|---|---|---|
| 5,832,903 A * | 11/1998 | White et al. | 123/514 |
| 6,155,212 A * | 12/2000 | McAlister | 123/3 |
| 6,279,603 B1 * | 8/2001 | Czarnik et al. | 137/339 |
| 6,422,520 B1 * | 7/2002 | Hand | 248/65 |
| 6,526,746 B1 * | 3/2003 | Wu | 60/286 |
| 6,742,330 B2 * | 6/2004 | Genderen | 60/286 |
| 6,912,846 B2 | 7/2005 | Huber | |
| 6,932,103 B2 * | 8/2005 | Iwamoto | 137/202 |
| 6,996,976 B2 * | 2/2006 | Rumminger et al. | 60/295 |
| 7,065,958 B2 | 6/2006 | Funk et al. | |
| 2002/0121085 A1 * | 9/2002 | Linsler | 60/299 |
| 2007/0033927 A1 | 2/2007 | Hornby et al. | |
| 2008/0022668 A1 | 1/2008 | Bugos | |

OTHER PUBLICATIONS

U.S. Appl. No. 11/802,209, Hornby et al., May 21, 2007.

* cited by examiner

LASER WELDED AUTOMOTIVE DIESEL EXHAUST HC DOSING VALVE

This application claims the benefit of the earlier filing date of U.S. Provisional Application No. 60/864,810, filed on Nov. 8, 2006, which is incorporated by reference herein in its entirety.

FIELD OF THE INVENTION

This invention relates to reducing and trapping diesel particulates and nitric oxide emissions of diesel engines, and more particularly, to a hydrocarbon (HC) dosing valve system for such diesel engines.

BACKGROUND OF THE INVENTION

Federal and state governments have imposed increasingly strict regulations over the years governing the levels of hydrocarbon (HC), carbon monoxide (CO) and nitrogen oxide (NOx) pollutants that a motor vehicle may emit to the atmosphere.

In diesel engine systems, a diesel particulate filter (DPF) is provided to trap the particulate matter in the exhaust passage of the diesel engine. Conventionally, a dosing valve is mounted into the exhaust manifold of a diesel system to inject diesel fuel into the exhaust to reduce the particulate matter and thus reduce NOx emissions. Since the temperature of the exhaust manifold can reach 600 C, water cooling is required to ensure that the valve survives.

Thus, there is a need to eliminate water cooling of an exhaust dosing valve and to reduce the number of components of a dosing valve system.

SUMMARY OF THE INVENTION

An object of the invention is to fulfill the need referred to above. In accordance with the principles of the present invention, this objective is achieved by providing dosing structure for supplying diesel fuel to an exhaust passage of a diesel system. The dosing structure includes an electrically operated control valve. An inlet tube is coupled with an inlet of the control valve. A first welded joint is provided between the inlet tube and the control valve. The inlet tube is constructed and arranged to be coupled to a supply of diesel fuel for feeding fuel to the control valve. A dosing valve is constructed and arranged to receive fuel from the control valve and deliver the fuel to the exhaust passage. An extension tube is fluidly coupled between the control valve and the dosing valve to space the control valve from the dosing valve and to permit fuel to be delivered from the control valve, through the extension tube, and to the dosing valve. A second welded joint is provided between the extension tube and the control valve. A third welded joint is provided between the extension tube and the dosing valve.

In accordance with another aspect of the invention, a method provides a diesel dosing structure for supplying diesel fuel to an exhaust passage of a diesel system to reduce particulates in the exhaust passage. The method provides a dosing valve coupled to an exhaust passage of a diesel system and constructed and arranged to inject fuel into the exhaust passage. An electrically operated control valve is associated with the dosing valve to supply diesel fuel to the dosing valve. A first end of an extension tube is welded to the control valve and a second end of the extension tube is welded to the dosing valve to space the control valve from the dosing valve such that heat generated in the exhaust passage is less at the control valve than at the dosing valve. An inlet tube is welded to an inlet of the control valve. A source of diesel fuel is provided to the inlet tube and thus to the control valve so that the control valve can control an amount of diesel fuel fed through the extension tube to the dosing valve for injection into the exhaust passage.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
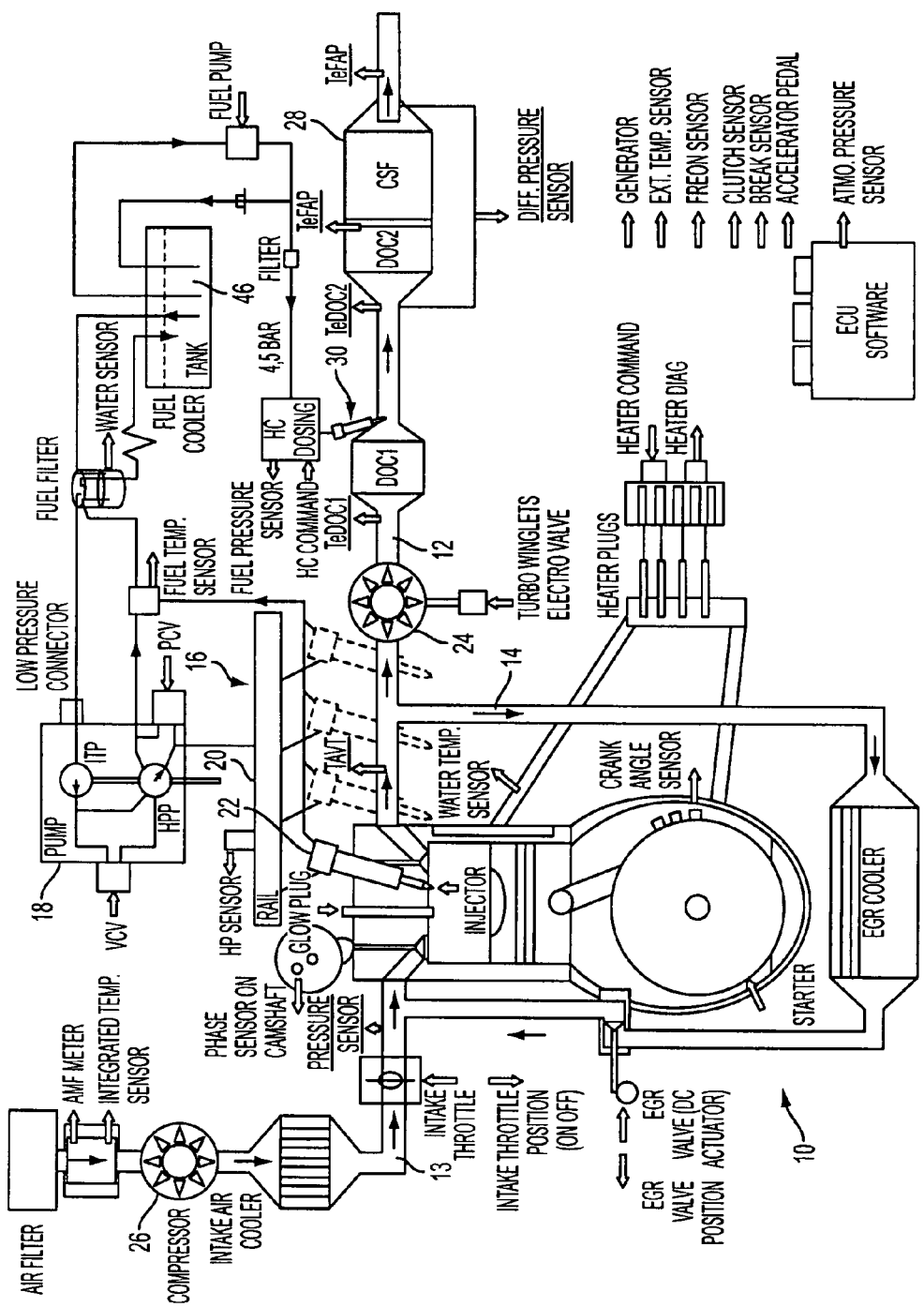
FIG. 1 is a schematic diagram of an exhaust gas purifying system including a diesel dosing structure in accordance with an embodiment of the present invention.

Referring to FIG. 1 of the drawings, a multi-cylinder diesel engine, generally indicated at 10, for vehicles is provided with an exhaust passage 12 and intake passage 13. The intake passage 13 is distributes intake air to each cylinder. The exhaust passage 12 and the intake passage 13 are connected by an exhaust gas recirculation (EGR) passage 14 in the conventional manner.

The engine 10 is provided with a common rail fuel injection device, generally indicated at 16. The fuel injection device 16 is provided with a supply pump 18, common rail 20 and an injector 22 provided for every cylinder. Fuel pressurized by the supply pump 18 is distributed to each injector 22 via the common rail 20.

A variable capacity turbocharger 24 is provided in the exhaust passage 12 downstream of the EGR passage 14. Compressor 26, installed in the intake passage 13, can be considered to be part of the turbocharger 24. A turbine (not shown) of the turbocharger 24 transforms the energy of the flow of exhaust gas into rotational energy, and can drive the compressor 26 using this rotational energy.

A diesel particulate filter (DPF) 28 which traps particulate matter in the exhaust gas is installed in the exhaust passage 12 downstream of the turbine 24. Diesel fuel burns off the particulates trapped in the filter, thus regenerating particulate storage capacity.

Figure 2:
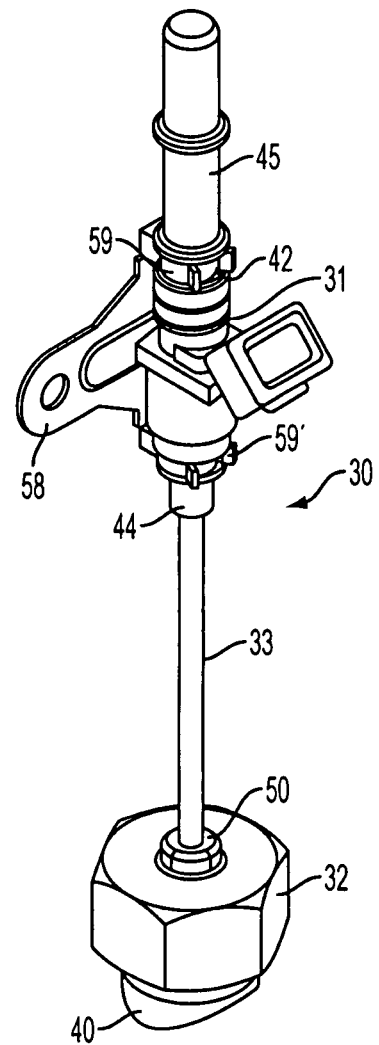
FIG. 2 is a view of the diesel dosing structure of FIG. 1.
Figure 5:
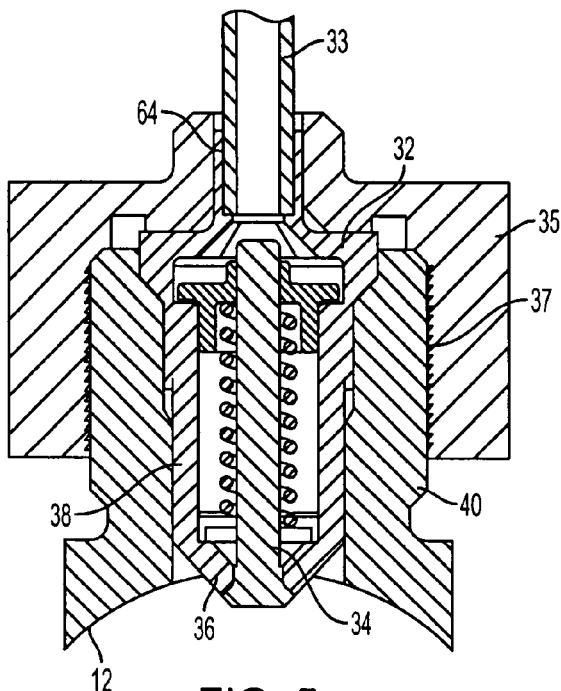
FIG. 5 is an enlarged sectional view of a dosing valve of the dosing structure of FIG. 2.

As shown in FIG. 1, a diesel dosing structure, generally indicated at 30, is provided to inject fuel into the exhaust stream. More particularly, the dosing structure 30 is preferably provided in the exhaust passage 12 upstream or downstream of the turbocharger 24, and upstream of the filter 28. With reference to FIG. 2, the dosing structure 30 includes a control valve 31, a dosing valve 32 and an extension tube 33 there-between. The dosing valve 32 is preferably in the form of a poppet valve. As shown in FIG. 5, the poppet valve 32 has a valve member 34 that extends outwardly from a body 36 of the valve 32 when in the opened position, permitting fuel to flow into the exhaust passage 12. In the embodiment, end 38 is inserted into the exhaust manifold 40. More particularly, as shown in FIG. 5, a cap 35 having internal threads 37 is threaded onto external threads of a portion of the manifold 40 (see FIG. 2). It can be appreciated that the cap 35 can have external threads that engage internal threads of the portion of the manifold 40.

The poppet valve 32 preferably has all metal construction (e.g., stainless steel), capable of withstanding the high temperature of the manifold 40. The poppet valve 32 is constructed and arranged to create a particular spray configuration into the exhaust passage 12.

The control valve 31 is preferably a gasoline, electrically operated fuel injector without a precision orifice. Since there is no need for special spray patterns from the injector, a simple pencil stream is sufficient. A suitable injector can be of the type disclosed in U.S. Patent Application Publication No. US 2007/0033927 A1, the content of which is hereby incorporated by reference into this specification. The control valve 31 has a fuel inlet 42 and a fuel outlet 44. The inlet 42 receives diesel fuel from the tank 46 (FIG. 1) via an inlet tube 45. The fuel outlet 44 is connected with one end of the extension tube 33, with another end of the extension tube 33 being connected with an inlet 50 of the dosing valve 32. The control valve 31 controls the flow rate to the dosing valve 32 and also shuts-off the flow.

The extension tube 33 is of sufficient length to place the control valve 31 away from the heat of the manifold 40. The extension tube 33 can be a metal tube or can be a flexible tube such as a fiberglass braided Teflon hose, capable of withstanding 230 C. Utilization of the flexible extension tube allows for mounting the control valve 31 on a chassis and the dosing valve 32 on the exhaust. This configuration accommodates large amounts of displacement. In other applications, the control valve and the dosing valve are mounted on the engine, thus a metal extension tube can be used. As shown in FIG. 2, a bracket 58 is coupled with the inlet tube 45 via a first clip 59 and is coupled with the control valve 31 near the extension tube 33 via another clip 59'. The bracket 58 is used to mount the control valve 31.

Figure 3:
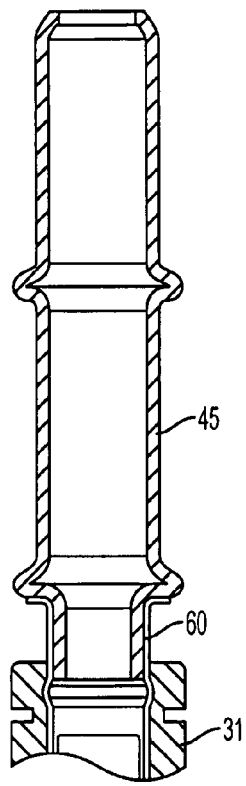
FIG. 3 is an enlarged sectional view of a laser weld between an inlet tube and the control valve of the dosing structure of FIG. 2.
Figure 4:
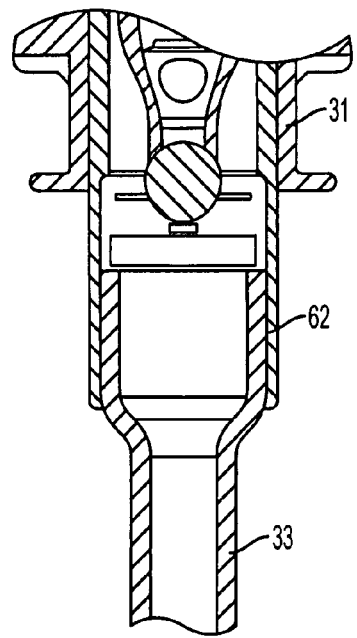
FIG. 4 is an enlarged sectional view of a laser weld between the control valve and an extension tube of the dosing structure of FIG. 2.

With reference to FIGS. 3-5, there is a joint 60 between the inlet tube 45 and the control valve 31, a joint 62 between the control valve 31 and a first end of the extension tube 33, and a joint 64 between a second end of the extension tube 33 and the dosing valve 32. In the embodiment, each joint 60, 62 and 64 is a welded joint and, in particular, a laser welded joint. Thus, no additional threaded parts are required, thereby reducing cost of the dosing structure 30.

Figure 6:
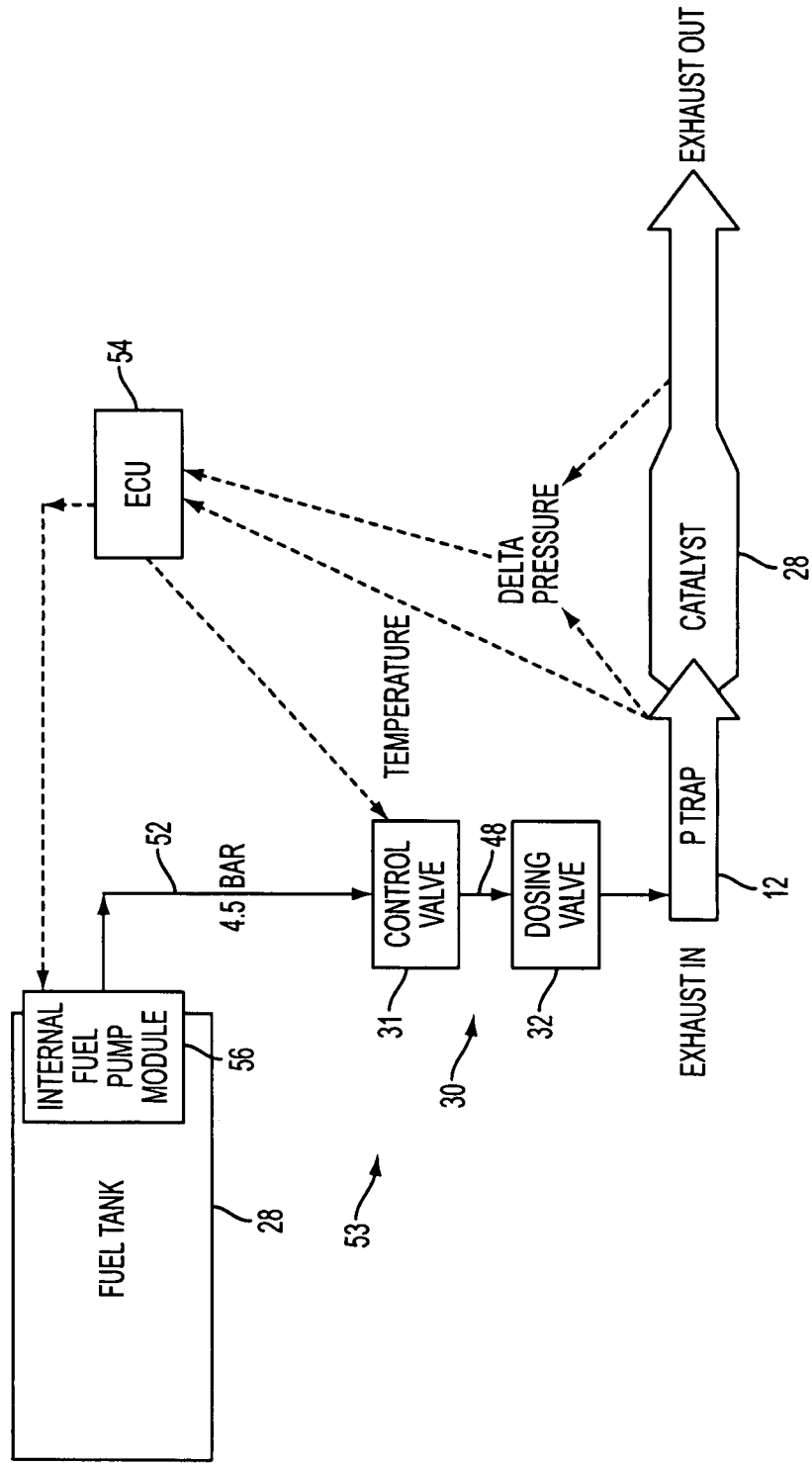
FIG. 6 is block diagram of a dosing system including the dosing structure.

FIG. 6 show a block diagram of a dosing system, generally indicated at 53, employing the dosing structure 30. Electrical connections are shown in dashed lines. Thus, an Electronic Control Unit (ECU) 54 can periodically control a fuel pump 56 to deliver diesel fuel from tank 28 to the control valve 31. The ECU also controls the control valve 31 to send fuel through the extension tube 33 to the dosing valve 32 and into the exhaust passage 12 to reduce particulates and possibly reduce NOx emissions. It can be appreciated that instead of the ECU 54 controlling the fuel injector 31, a separate controller can control the fuel injector 31.

The dosing structure 30 also reduces oil dilution. In addition, system cost is reduced since a smaller particulate trap can be used, the water cooled system is eliminated, O-rings and polymers are eliminated in high temperature locations, and the structure 30 uses existing technologies.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Dosing structure for supplying diesel fuel to an exhaust stream of a diesel system, the dosing structure comprising: an electrically operated control valve, an inlet tube coupled with an inlet of the control valve, a first welded joint between the inlet tube and the control valve, the inlet tube being constructed and arranged to be coupled to a supply of diesel fuel for feeding fuel to the control valve, a fluid pressure operated dosing valve constructed and arranged to receive fuel from the control valve and having structure movable from a closed position to an open position to deliver the fuel to the exhaust stream, an extension tube fluidly coupled between the control valve and the dosing valve to space the control valve from the dosing valve and to permit fuel to be delivered from the control valve, through the extension tube, and to the dosing valve, a second welded joint between the extension tube and the control valve, and a third welded joint between the extension tube and the dosing valve; a bracket associated with the control valve for mounting the control valve, the bracket including a pair of clips, one of the clips being coupled to the inlet tube and another clip being coupled to the control valve near the extension tube.

2. Dosing structure for supplying diesel fuel to an exhaust stream of a diesel system, the dosing structure comprising: an electrically operated control valve, an inlet tube coupled with an inlet of the control valve, a first welded joint between the inlet tube and the control valve, the inlet tube being constructed and arranged to be coupled to a supply of diesel fuel for feeding fuel to the control valve, a fluid pressure operated dosing valve constructed and arranged to receive fuel from the control valve and having structure movable from a closed position to an open position to deliver the fuel to the exhaust stream, an extension tube fluidly coupled between the control valve and the dosing valve to space the control valve from the dosing valve and to permit fuel to be delivered from the control valve, through the extension tube, and to the dosing valve, a second welded joint between the extension tube and the control valve, and a third welded joint between the extension tube and the dosing valve; the dosing valve having a cap that is constructed and arranged to be in threaded engagement with a portion of an exhaust passage that contains the exhaust stream.

* * * * *